United States Patent
Lurie et al.

(10) Patent No.: US 11,383,933 B2
(45) Date of Patent: Jul. 12, 2022

(54) WIND DEFLECTION APPARATUSES FOR TROUGH CONVEYORS

(71) Applicant: THYSSENKRUPP INDUSTRIAL SOLUTIONS (USA), INC., Greenwood Village, CO (US)

(72) Inventors: Martin S. Lurie, Englewood, CO (US); R. Steven Kasper, Parker, CO (US)

(73) Assignee: THYSSENKRUPP INDUSTRIAL SOLUTIONS (USA), INC., Greenwood Village, CO (US)

( * ) Notice: Subject to any disclaimer, the term of this patent is extended or adjusted under 35 U.S.C. 154(b) by 0 days.

(21) Appl. No.: 16/973,507

(22) PCT Filed: Jun. 12, 2019

(86) PCT No.: PCT/US2019/036661
§ 371 (c)(1),
(2) Date: Dec. 9, 2020

(87) PCT Pub. No.: WO2019/241316
PCT Pub. Date: Dec. 19, 2019

(65) Prior Publication Data
US 2021/0245957 A1   Aug. 12, 2021

Related U.S. Application Data

(60) Provisional application No. 62/698,651, filed on Jul. 16, 2018, provisional application No. 62/684,049, filed on Jun. 12, 2018.

(51) Int. Cl.
*B65G 21/08* (2006.01)
*B65G 15/08* (2006.01)
*B65G 21/02* (2006.01)

(52) U.S. Cl.
CPC ............ *B65G 21/08* (2013.01); *B65G 15/08* (2013.01); *B65G 21/02* (2013.01)

(58) Field of Classification Search
None
See application file for complete search history.

(56) References Cited

U.S. PATENT DOCUMENTS

| | | | |
|---|---|---|---|
| 3,545,602 A | 12/1970 | McCullagh | |
| 7,743,914 B2 * | 6/2010 | Nagahama | B65G 69/181 198/860.3 |
| 2003/0057057 A1 | 3/2003 | Bernhardt | |

FOREIGN PATENT DOCUMENTS

| | | |
|---|---|---|
| DE | 2912993 A | 10/1980 |
| JP | S54-122578 A | 9/1979 |

OTHER PUBLICATIONS

International Search Report issued in PCT/US2019/036661, dated Aug. 2, 2019.

\* cited by examiner

*Primary Examiner* — Kavel Singh
(74) *Attorney, Agent, or Firm* — thyssenkrupp North America, LLC

(57) ABSTRACT

A trough conveyor that transports fine bulk material and is exposed to windy conditions may include a belt for transporting bulk material, a center roll for supporting the belt, first and second wing rolls that support angled segments of the belt, a frame that supports the center roll and the first and second wing rolls, and a hood cover disposed above the belt. The trough conveyor may also include first and second baffles that form labyrinths that help attenuate wind velocity over the fine bulk material. The baffles may also help contain fine bulk material that is stirred up within a stilling space formed between the hood cover, the belt, and the baffles. In (Continued)

addition or in the alternative, the trough conveyor may include fairings that deflect crosswind beneath the belt.

20 Claims, 3 Drawing Sheets

WIND DEFLECTION APPARATUSES FOR TROUGH CONVEYORS

CROSS-REFERENCE TO RELATED APPLICATIONS

This application is a U.S. National Stage Entry of International Patent Application Number PCT/US2019/036661, filed Jun. 12, 2019, which claims priority to U.S. Provisional Application No. 62/684,049, which was filed Jun. 12, 2018, and U.S. Provisional Application No. 62/698,651, which was filed on Jul. 16, 2018, the entire contents of both of which are hereby incorporated by reference herein.

FIELD OF THE DISCLOSURE

The present disclosure generally relates to conveyors, including baffles, hoods, and other wind deflection apparatuses for trough conveyors that protect material being conveyed from wind and other elements.

BACKGROUND

When conveying material with a trough belt conveyor, especially fine bulk material, wind blowing across, along, or against the trough belt conveyor may cause material particles to be lifted off the belt and dispersed into the surrounding environment. Even air associated with movement of the belt may have such an effect. A purely exemplary trough belt conveyor is depicted in German Patent No. DE 2912993 A1, which is hereby incorporated by reference in its entirety. Such loss of material is undesirable. Prior attempts to safeguard material being conveyed have involved the complete enclosure of carry belts that transport the material. However, completely enclosing a carry belt to protect material from wind and other elements prevents, or at the very least complicates, visual inspection of wing rolls by operators traveling alongside the conveyor.

Other attempts to safeguard material being conveyed have focused on skirtboards disposed alongside conveyors. But positioning skirtboards along the length of the conveyor is also undesirable because belts move laterally and vertically during normal operation, which causes the belt to come in contact with the skirtboards. Consequently, friction between the belt and the skirtboards leads to wear of the belt and hence a shortened lifespan. In still other cases, pipe conveyors have been used to contain the bulk material being conveyed. However, pipe conveyors have several significant disadvantages compared to trough conveyors, including high capital cost, high maintenance cost, and high energy consumption.

Thus a need exists for an inexpensive apparatus that protects material being conveyed along a trough belt conveyor, which apparatus permits access to components such as wing rolls disposed alongside the conveyor.

SUMMARY

Some example trough conveyors of the present disclosure may include a belt for transporting material along a length in a longitudinal direction. The belt may include a horizontal segment and at least one angled segment that extends upwards from the horizontal segment of the belt. Put another way, the angled segment of the belt may have a first end that is lower and thus closer to the ground than a second end. A center roll may support the horizontal segment of the belt, whereas a wing roll may support the angled segment of the belt. In many cases, a frame supports the center roll and the wing roll. The trough conveyor may further include a hood cover that extends above the belt.

In some instances, the trough conveyor may include a fairing or pair of fairings for deflecting crosswind beneath the belt. The fairing may extend from the frame into a space below the belt and, in some examples, beneath an underside of the belt. The fairing may also extend along at least a portion of the length traversed by the belt. Depending on the terrain, the fairing may be planar and generally horizontal. The fairing may include a lateral wall that is secured to the frame. One having ordinary skill in the art will appreciate that in some cases the fairing may slope downwards with proximity to the belt. The fairing can even be secured to the hood cover to prevent crosswind from reaching the belt and/or the material conveyed by the belt. Thus crosswind may be deflected either above the belt by the hood cover or below the belt by the fairing. In some examples, the fairing may be shaped and disposed such that the fairing is substantially symmetrical with the hood cover, thereby promoting an equal amount of crosswind to be deflected above and below the belt. Because the terrain over which trough conveyors extend typically varies, the fairings may include an adjustable hinge that permits adjustment of an angle of the fairing relative to the frame. In other words, the angle of the fairing relative to the frame of some portions of the fairing in the longitudinal direction may vary from the angles of other portions of the fairing depending on the terrain and spacing relative to the ground. Lastly, the fairing may include cutouts that extend in the longitudinal direction and provide access at least to the center roll and wing roll without having to remove the fairing. The cutouts also permit a plane of the fairing to be located in an optimal position and such that the fairing does not interfere with the wing roll.

In addition or in the alternative to the fairings, some example trough conveyors may include at least one baffle disposed about the second end of the angled segment of the belt. The baffle may have a first wall and a second wall that form a "V" shape or a "U" shape. The walls of the baffle may "hug" the angled segment of the belt such that the second wall of the baffle is disposed below and adjacent to a lower surface of the angled segment and such that the first wall of the baffle is disposed above and adjacent to an upper surface of the angled segment of the belt. In some examples, the hood cover, the belt, and a pair of baffles may form a stilling space that serves as a large plenum that enables any suspended particles of material being conveyed to fall back onto the belt. In effect, the baffle acts as a labyrinth that wind must traverse before reaching the stilling space. Moreover, similar to the fairings, the baffles may include cutouts that extend in the longitudinal direction.

DETAILED DESCRIPTION

Although certain example methods and apparatuses have been described herein, the scope of coverage of this patent is not limited thereto. To the contrary, this patent covers all methods, apparatuses, and articles of manufacture fairly falling within the scope of the appended claims, either literally or under the doctrine of equivalents. The below disclosure is intended to be illustrative so that others may follow its teachings. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claim need not necessarily be performed in the order in which they are recited, unless so required by the context of the claims. In addition, all references to one skilled in the art shall be understood to refer to one having ordinary skill in the art.

Figure 1:
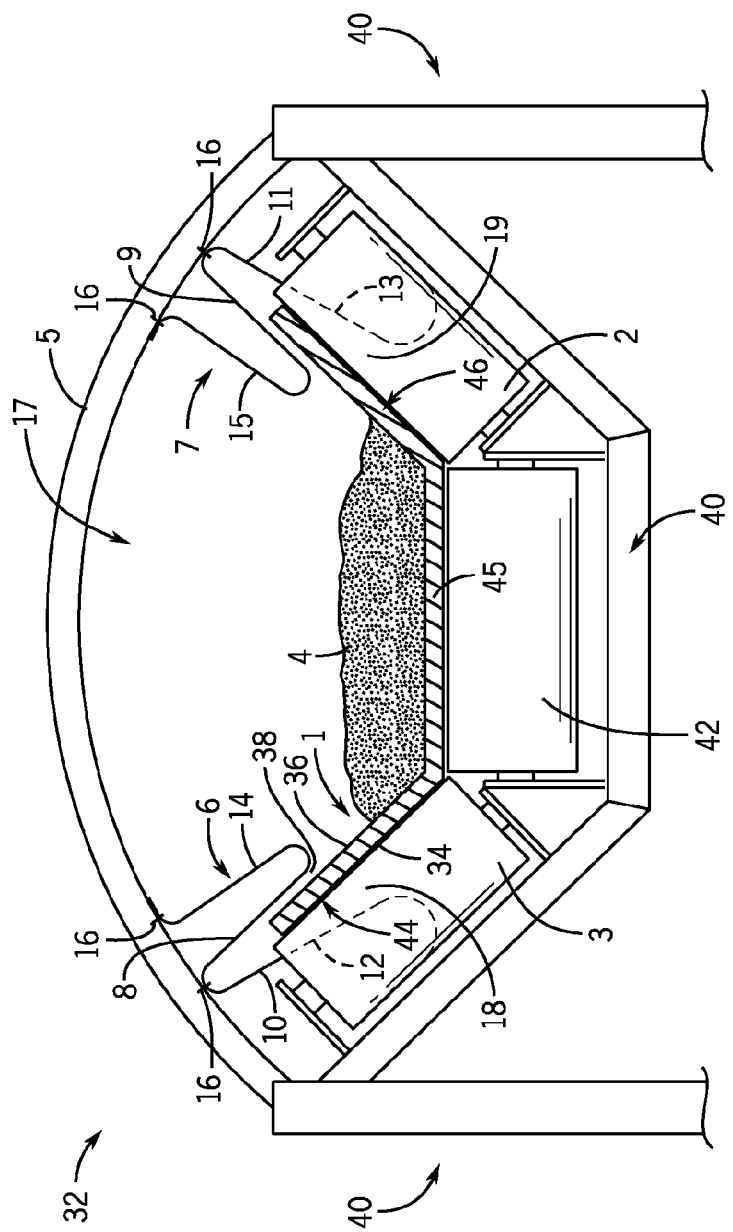
FIG. 1 is a cross-sectional view of a carry side of an example trough conveyor outfitted with an example hood cover and example labyrinth wind baffles.

With reference now to FIG. 1, a cross-sectional view of a carry side of a belt 1 of an example trough conveyor 32 is shown. The trough conveyor 32 in this example includes a frame 40 that supports a first wing roll 3, a second wing roll 2, and a center roll 42. The first wing roll 3, the second wing roll 2, and the center roll 42 support the belt 1, drive the belt 1, and/or facilitate movement of the belt 1. Those having ordinary skill in the art will understand that the present disclosure is not limited to trough conveyors having three rolls. In other examples, for instance, trough conveyors may be comprised of only two rolls that form a "V" shape, of five rolls, or combinations thereof along lengths of the trough conveyors. Nonetheless, the example trough conveyor 32 in FIG. 1 is outfitted with an example hood cover 5 and example first and second labyrinth wind baffles 6, 7. The hood cover 5 and the first and second baffles 6, 7 are configured to prevent fine bulk material 4, which is transported on the belt 1, from being dispersed by the wind.

In some cases, the first and second baffles 6, 7 extend along a length of the trough conveyor 32 between a loading station and a discharge station, but the first and second baffles 6, 7 are not disposed at the loading station or the discharge station. In other cases, the first and second baffles 6, 7 are only included along exposed lengths of the trough conveyor 32 that experience strong winds. The first and second baffles 6, 7 may be supported by the frame 40 and/or the hood cover. Still further, in some instances the first and second baffles 6, 7 may be incorporated directly into the frame 40.

In some examples, a stilling space 17 may be formed between the hood cover 5, the belt 1, and the first and second baffles 6, 7. The stilling space 17 may serve as a large plenum that enables suspended particles to fall back onto the belt 1. This behavior results even though air velocity may be slightly elevated in constricted passages between the belt 1 and the baffles 6, 7, as explained below. Further, the first baffle 6 on the left in FIG. 1 may include a first wall 8 and a second wall 10 that form a "U" shape or a "V" shape disposed in close proximity to and about a first angled segment 44 of the belt 1 that extends at least partially upward from a horizontal reference or a horizontal segment 45 of the belt 1. While the present disclosure may focus primarily on the first baffle 6 of FIG. 1 to illustrate various exemplary design principles, those having ordinary skill in the art will recognize that in some examples the same exemplary design principles may apply equally to the second baffle 7. As purely an example, the second baffle 7 on the right in FIG. 1 may likewise include a first wall 9 and a second wall 11 that form a "U" or "V" shape disposed in close proximity to and about a second angled segment 46 of the belt 1 extending at least partially upward. As those having ordinary skill in the art will also recognize, in some examples the first baffle 6 and/or the second baffle 7 may only include one wall or may include three or more walls.

In other examples not represented by FIG. 1, a trough conveyor may omit a hood cover. In these examples, baffles may extend high enough so as to effectively redirect crosswind and prevent the crosswind from dispersing any fine bulk material. Alternatively, baffles disposed on opposite sides of a belt may be connected above the belt as a substitute for a hood cover.

Considering now a scenario where wind blows generally left to right in FIG. 1, for example, the first and second baffles 6, 7 may be configured so that a portion of the wind moving transversely toward the fine bulk material 4 will first encounter the second wall 10 of the first baffle 6. A portion of this airstream will be dammed up and reflected back into the incoming airstream by the second wall 10. This reflected airstream will both slow the incoming airstream and deflect the incoming airstream so that at least a portion of the airstream flows below the belt 1, rather than over the hood cover 5. A subset of the portion of the airstream that flows below the belt 1 may make its way around the second wall 10 and into a gap 18 between the second wall 10 and a lower surface 34 of the first angled segment 44 of the belt 1. As explained below in more detail, the gap 18 may be relatively narrow so as to exclude as much of the airstream as possible.

In some cases the second wall 10 of the first baffle 6 may be disposed generally parallel (i.e., ±5°) to the first angled segment 44 of the belt 1. Yet in other cases, such as that shown in FIG. 1, for example, the second wall 10 of the first baffle 6 may be disposed at an angle relative to the first angled segment 44 of the belt 1. In some examples, moreover, the gap 18 between the second wall 10 and the lower surface 34 of the first angled segment 44 of the belt 1 may be a predetermined dimension that is only large enough to prevent contact between the second wall 10 and the belt 1 when the belt 1, for instance, sags by predetermined amounts due to tension fluctuations that may occur during starting and stopping of the trough conveyor 32. For example and without limitation, the gap 18 may be less than one inch, less than two inches, less than three inches, and so on up to thirty inches—as measured in a parallel configuration, as measured between closest points of contact, or as measured between farthest points of contact. Similarly, it should be understood that a gap 19 may exist between the second angled segment 46 of the belt 1 and the second wall 11 of the second baffle 7.

With continued reference to FIG. 1, the first wall 8 of the first baffle 6 may be mounted at a position as close as possible to an upper surface 36 of the belt 1, but may leave enough clearance to allow for tolerances required for conveyor operation. A gap 38 between the first baffle wall 8 of the first baffle 6 and the upper surface 36 of the belt 1 may restrict the volume of air that the wind can drive in towards the fine bulk material 4 on the belt 1. Much or all of the disclosure above with respect to the relationship between the second wall 10 and the lower surface 34 of the belt 1 may be equally applicable here to the first wall 8 and the upper surface 36 of the belt 1, but will not be reproduced in the interests of brevity.

The shape of the example baffles 6, 7 as well as the spacing between the baffles 6, 7 and the belt 1 may be configured to provide sufficient clearance for the belt 1 to mis-track without touching the baffles 6, 7; to prevent a slitting risk to the belt 1; to prevent contact between the belt 1 and the baffles 6, 7 due to belt sag during starting or stopping; and/or to prevent the belt flap from contacting the baffles 6, 7. Of course it should be understood that the shapes of the baffles 6, 7 described and depicted herein are merely exemplary and that the present disclosure contemplates a variety of shapes that baffles could assume to prevent wind from dispersing the fine bulk material 4. Notwithstanding, the baffles 6, 7 may be configured to allow clearance between lateral edges of the belt 1 and the walls 8, 9, 10, 11 of the baffles 6, 7. Such lateral clearance may ensure that when the belt 1 mis-tracks laterally away from its nominal or central position due to the effects of horizontal curves or splice imperfections, for example, the baffles 6, 7 will not interfere with the belt 1.

As explained above, in some cases the walls 8, 9, 10, 11 of the first and second baffles 6, 7 may be in relatively close proximity to the upper and lower surfaces of the belt 1, such as with respect to the gap 18 between the lower surface 34 of the first angled segment 44 of the belt 1 and the second wall 10 of the first baffle 6, for example. A labyrinth principle may be employed to force crosswind to travel circuitous routes and lose velocity before reaching the surface of the fine bulk material 4 on the belt 1. More particularly, by positioning the walls 8, 9, 10, 11 in close proximity to the surfaces of the belt 1, the circuitous routes associated with the first and second baffles 6, 7 cause airstreams to have to flow in channels that are narrow and run counter to the directions of the airstreams before reaching the fine bulk material 4. Put another way, the first and second baffles 6, 7 significantly limit the amount of wind that reaches the surface of the fine bulk material 4. Such an arrangement, particularly with respect to the first walls 8, 9 of the first and second baffles 6, 7, is made possible at least in part due to the absence of lumps in the fine bulk material 4, such as sand, for example and without limitation. Such an arrangement also helps to contain airborne material within the stilling space 17 above the belt 1.

One having ordinary skill in the art will understand that although air velocity may temporarily increase when air passes through the gap 38, friction associated with the first baffle wall 8 and the upper surface 36 of the belt 1 causes the air to lose energy. When the air then exits the gap 38 into the stilling space 17, the velocity decreases considerably due to the substantial increase in cross-sectional area, following Bernoulli's principle. With the decrease in velocity, particles of the fine bulk material 4 that may have been entrained in the incoming airflow are likely to settle out of the air in the stilling space 17 and fall back onto the fine bulk material 4 resting on the belt 1.

Due to the proximity between the second walls 10, 11 and the belt 1, planes of the second walls 10, 11 may, respectively, obstruct and/or intersect spaces occupied by the first wing roll 3 and the second wing roll 2 of the trough conveyor 32. To prevent obstruction and/or interference at these intersections and to permit access to the first and second wing rolls 3, 2, the second walls 10, 11 of the baffles 6, 7 may include cutouts 12, 13 at predetermined positions that receive the first and second wing rolls 3, 2. As those having ordinary skill in the art will appreciate, the size and shape of the cutouts 12, 13, which in some examples may be U-shaped, can be selected to provide sufficient clearance between the second walls 10, 11 and the first and second wing rolls 3, 2 to allow for structural tolerances and to leave gaps as small as practicable to minimize the opening available for wind to reach the fine bulk material 4.

Still further, positions of the baffles 6, 7 along a length of the trough conveyor 32 may in some examples be readily adjustable to ensure alignment of the cutouts 12, 13 and the first and second wing rolls 3, 2. As merely examples, the baffles 6, 7 may include longitudinal slots or series of apertures extending along lengths of the trough conveyor 32 through which fasteners may be disposed to facilitate attachment of one longitudinal baffle segment to another. Such means for attaching longitudinal segments of the baffles 6, 7 permit flexibility in positioning the baffles 6, 7 relative to the first and second wing rolls 3, 2.

In addition, if wind-driven air has entered the stilling space 17 by passing through the labyrinth of the first baffle 6, the second baffle 7 on the opposite side of the belt 1 presents an obstruction that reduces the flow's ability to entrain particles of load and exit via the opposite side of the belt 1. In some cases an approximate balance of pressures may be obtained from one side of the belt 1 to the other. The balance may be caused by way of an entrainment effect creating a partial vacuum below each baffle 6, 7 when there is a substantial flow of air below the belt 1. To this end, in some cases the baffles 6, 7 may establish a pressure-balanced volume of air in the stilling space 17, resulting in negligible air flow across the top of the fine bulk material 4. The baffles 6, 7 may sufficiently obstruct air flowing above the belt 1 such that almost all of the wind blowing across the trough conveyor 32 separates into streams flowing over the hood cover 5 or under the belt 1. With respect to the portion of the airstream that flows under the belt 1, there may be an entrainment effect present at the gaps 18, 19. Such entrainment may arise when air flowing transversely under the belt 1 creates low-pressure areas at the openings to both gaps 18, 19. These low-pressure areas can balance one other, resulting in a desirable stagnation of air in the stilling space 17.

In some cases, the baffles 6, 7 may further include, respectively, supporting walls 14, 15 to stiffen the baffles 6, 7 against wind-induced vibrations. What's more, the baffles 6, 7 may be mounted to the hood cover 5 by fasteners 16 such as clips, clasps, bolts, zippers, snaps, welds, or the like, for example. In some cases, the hood cover 5 may be secured in an airtight manner to the baffles 6, 7 such that air cannot pass between the hood cover 5 and the baffles 6, 7. In other cases, though, the hood cover 5 may be secured to the baffles 6, 7 at periodic locations along the length of the trough conveyor 32. As such, the connection between the hood cover 5 and the baffles 6, 7 is not necessarily airtight along the length of the trough conveyor 32 and a nominal amount of air may pass between the baffles 6, 7 and the hood cover 5.

In some examples, the hood cover 5 may be curved to an extent sufficient to place the lateral edges of the hood cover 5 at a height above grade that is horizontally below the edges of the belt 1. Such an arrangement further shields the fine bulk material 4 on the belt 1 from crosswind. The hood cover 5 may be supported by the frame 40 of the trough conveyor 32.

On trough conveyors, one way of replacing wing rolls is by lifting the belt a short distance clear of the wing rolls to provide room for the wing rolls to be raised out of their mounting slots. In the present disclosure, it may be desirable to be able to replace the first and second wing rolls 3, 2 without detaching the baffles 6, 7 from the hood cover 5 or without entirely removing the hood cover 5. Therefore, in some cases, the hood cover 5 may be hinged at one lateral side and held detachably at the other. The baffles 6, 7 may be geometrically configured and/or strategically positioned such that by raising a detachable lateral side of the hood cover 5, sufficient space is provided to allow the belt 1 to be lifted and/or for the first and second wing rolls 3, 2 to be removed and replaced.

The baffles 6, 7 may be removed from the example trough conveyor 32, for example, by first disconnecting the hood cover 5 from the frame 40. The left side of the hood cover 5 in FIG. 1 may be lowered such that the first and second walls 8, 10 of the baffle 6 approach the first angled segment 44 of the belt 1. The right side of the hood cover 5 may then be rotated counterclockwise, as the second wall 11 of the baffle 7 will now be able to clear the second angled segment 46. After rotating the hood cover 5 counterclockwise to an extent, both baffles 6, 7 will be positioned sufficiently-free of the first and second angled segments 44, 46 so that the hood cover 5 can be lifted upwards. One having ordinary skill in the art will recognize that the baffles 6, 7 can be installed on preexisting conveyors, or back on the example trough conveyor 32, by way of a similar method.

Figure 2:
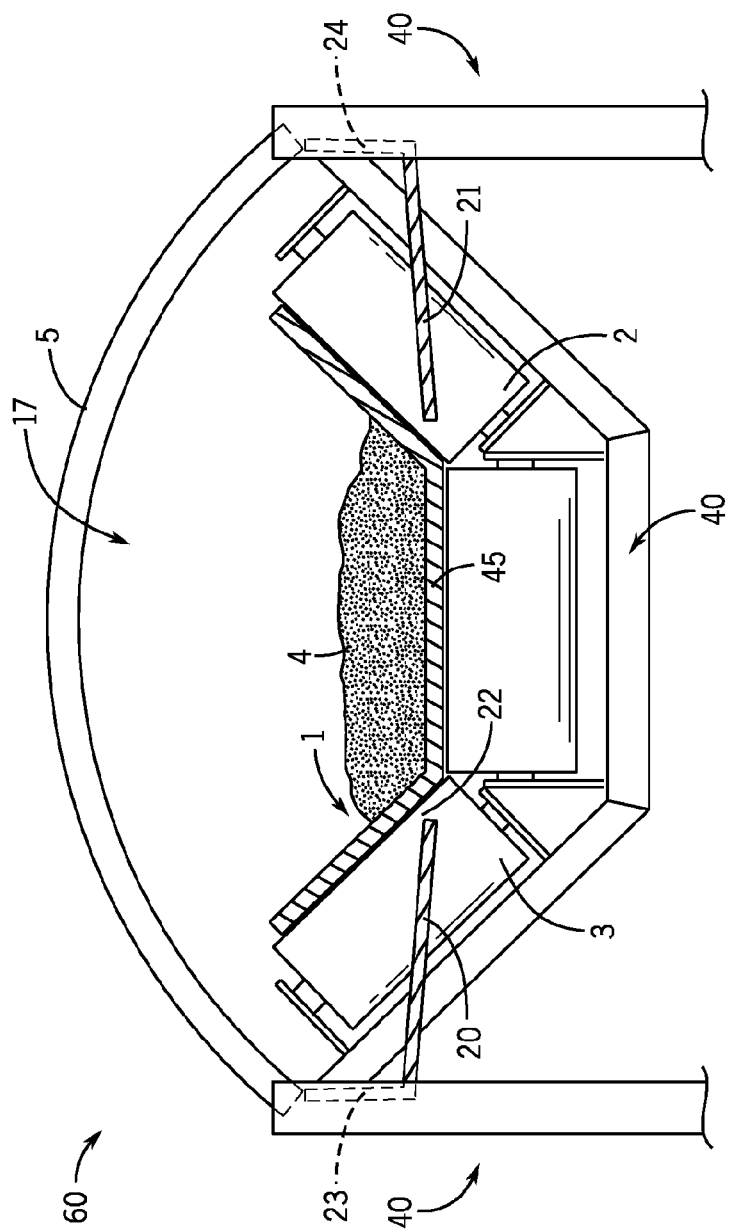
FIG. 2 is a cross-sectional view of a carry side of another example trough conveyor, which includes example fairings.

With reference now to FIG. 2, another example trough conveyor 60 is shown. The trough conveyor 60 may include one or more fairings 20, 21, which in the example shown in FIG. 2 are continuous, planar, longitudinal structures that project from the frame 40 generally horizontally (i.e., ±5°) into the space below the belt 1. In other examples, however, the fairings 20, 21 may slope upwards or downwards with increasing proximity to the belt 1. In still other examples, the fairings 20, 21 may be concavely or convexly curved. Hence in some examples the trough conveyor 60 may have a convex profile overall depending on the degree to which the fairings 20, 21 are convexly curved. The fairings 20, 21 may even have substantial symmetry with the hood cover 5 about a horizontal axis that passes through the trough conveyor 60. One advantage of such a configuration is that an amount of wind that passes over the trough conveyor 60 is generally equal to an amount of wind that passes under the trough conveyor 60.

The fairings 20, 21 direct transverse wind currents below the belt 1 and limit the amount of airflow that reaches and/or is driven over the carry side of the belt 1. Hence, in some instances, edges of the fairings 20, 21 nearest the belt 1 may be disposed generally at the same elevation as an underside of the belt 1. As such, the fairings 20, 21 provide a relatively uninterrupted path for horizontal wind passage that is transverse to a longitudinal axis of the trough conveyor 60. Yet in other instances, edges of the fairings 20, 21 nearest the belt 1 may be disposed beneath the underside of the belt 1 (e.g., three inches, six inches, nine inches, one foot, one and a half feet, two feet, or three feet, as measured in a vertical direction). Compared to the baffles 6, 7, the fairings 20, 21 are relatively remote from the material carried by the belt 1 and, therefore, may be more suitable for use in conveyors carrying a variety of material, including material with large or abrasive lumps. Conversely, the baffles 6, 7 may be better suited for conveyors carrying fine materials, as there is little risk of collision or entrapment of lumps of material between the belt 1 and the first walls 8, 9.

Although FIG. 2 does not illustrate means for structurally supporting the fairings 20, 21, those having ordinary skill in the art will recognize that a variety of suitable supports may be utilized. In some cases, the fairings 20, 21 may be supported by the hood cover 5 and/or the frame 40 of the trough conveyor 60. The fairings 20, 21 may also be configured for easy removal and re-attachment to facilitate wing roll maintenance and/or replacement. In other cases, the fairings 20, 21 may be configured to hinge about a first edge and to detach at a second edge so as to allow accumulated material to slide off at the detached edge.

To enhance the versatility of the fairings 20, 21 depending on the terrain along the length of the trough conveyor 60, the fairings 20, 21 may include adjustable hinges, slotted attachment points, variable-angle attachment points, or the like that permit the fairings 20, 21 to be installed at different angles relative to the frame 40 and/or the trough conveyor 60 generally. By way of example, at some locations where the trough conveyor 60 is at a first height above the ground, the fairings 20, 21 may slope slightly downwards (or even upwards) with increasing proximity to the belt 1. At some locations where the trough conveyor 60 is at a second height above the ground, though, the fairings 20, 21 may slope significantly downwards with increasing proximity to the belt 1.

Similar to the baffles 6, 7, the fairings 20, 21 may include cutouts at locations occupied by the first wing roll 3 and the second wing roll 2 of the trough conveyor 60. Such cutouts in the fairings 20, 21 may prevent obstruction and/or interference and may permit access to the first and second wing rolls 3, 2. Further to this end, the fairings 20, 21 may be positioned at an elevation sufficient to allow at least portions of the wing rolls 2, 3 to project below a plane of the fairings 20, 21. Such a configuration permits visual inspection of the wing rolls 2, 3 without needing to remove the fairings 2, 3.

The fairings 20, 21 and the hood cover 5 may form a nearly-complete capsule around the belt 1, with an opening extending between inner edges of the fairings 20, 21. In some cases, to further prevent airflow from reaching the belt 1, the fairings 20, 21 may include lateral walls 23, 24. In some examples, the lateral walls 23, 24 may be disposed generally vertically (i.e., ±5°), as shown in FIG. 2, and may be secured to the frame 40. The lateral walls 23, 24 can also be angled so as to form a sharper leading edge with respect to transverse airflows. In other cases, the fairings 20, 21 may be secured directly to the hood cover 5 so that the lateral walls 23, 24 are not required. Those having ordinary skill in the art will recognize that the effectiveness of the fairings 20, 21 (or the baffles 6, 7) may increase as the profile of the trough conveyor 60 shrinks and becomes streamlined, causing the trough conveyor 60 to "catch" less crosswind. Minimizing obstruction to airflow reduces the amount of air that may be forced up and around the loaded belt 1. In short, it is advantageous to offer crosswind the most unobstructed path possible.

Furthermore, a gap 22 may be provided between the fairings 20, 21 and an underside of the belt 1. A size of the gap 22 (e.g., three inches, six inches, nine inches, one foot, one and a half feet, two feet, or three feet, as measured between an edge of one of the fairings 20, 21 and an edge of the belt 1) may be predetermined so as to prevent the belt 1 from contacting the fairings 20, 21 during transients, for instance, when tension in the belt 1 may decrease and the belt 1 may sag.

Figure 3:
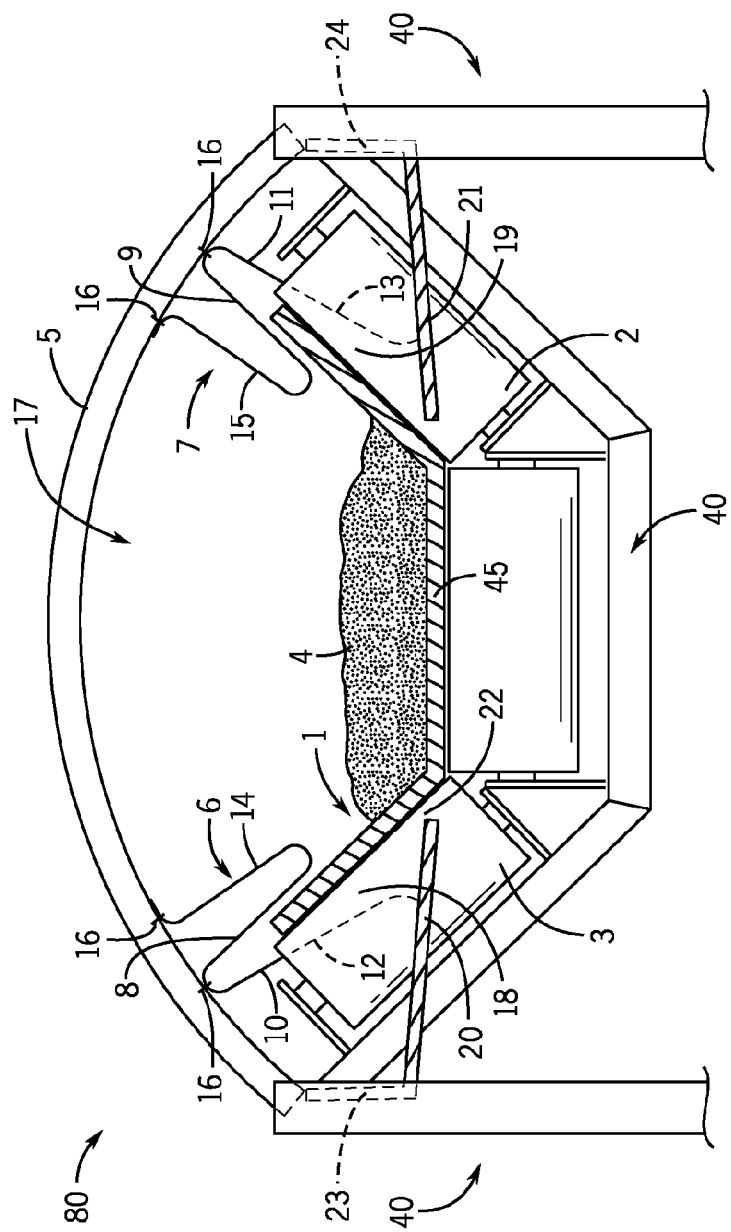
FIG. 3 is a cross-sectional view of a carry side of another example trough conveyor, which includes example labyrinth wind baffles and example fairings.

Still further, in some cases such as that shown in FIG. 3, an example trough conveyor 80 may include the baffles 6, 7 and the fairings 20, 21. In these examples, the baffles 6, 7 may be omitted along segments of the trough conveyor 80 where the fairings 20, 21 are included, as the fairings 20, 21 alone can provide sufficient wind protection in some scenarios. In addition, in some examples the baffles 6, 7, the hood cover 5, and/or the fairings 20, 21 may include textured surfaces, such as the dimples on a golf ball, for example, which ultimately cause less airflow to reach the belt 1. Finally, inasmuch as the example baffles 6, 7 and the example fairings 20, 21 minimize the effect of wind on the material being carried by the belt 1, the example baffles 6, 7 and the example fairings 20, 21 also prevent ingress of rain, dust, snow, and other airborne elements that could potentially contaminate the payload.

What is claimed is:

1. A trough conveyor comprising:
   a belt for transporting material along a length, the belt including a horizontal segment and an angled segment that extends at least partially upward from the horizontal segment;
   a center roll that supports the horizontal segment of the belt;
   a wing roll that supports the angled segment of the belt;
   a frame that supports the center roll and the wing roll;
   a fairing for deflecting crosswind, wherein the fairing extends from the frame into a space below the belt, wherein the fairing extends along at least a portion of the length traversed by the belt; and
   a baffle comprising a first wall that is connected to a second wall, the baffle being disposed about the angled segment of the belt, wherein at least the first wall or the second wall is substantially parallel with the angled segment of the belt, wherein an angle formed between the first and second walls is less than 45 degrees.

2. The trough conveyor of claim 1 wherein the first and second walls of the baffle form a "V" shape or a "U" shape about a distal end of the angled segment of the belt, with the distal end being substantially equidistant from the first wall and the second wall.

3. The trough conveyor of claim 1 wherein the fairing is generally horizontal, is planar, and deflects crosswind beneath the belt, with generally horizontal being within ±5 degrees of a rotational axis of the center roll.

4. The trough conveyor of claim 1 wherein the first wall is integrally connected to the second wall.

5. The trough conveyor of claim 1 wherein an angle formed between the first and second walls is less than 30 degrees.

6. A trough conveyor comprising:
   a belt for transporting material along a length in a longitudinal direction, the belt including an angled segment having a first end that is lower than a second end;
   a wing roll that supports the angled segment of the belt;
   a frame that supports the wing roll; and
   a fairing for deflecting crosswind, wherein the fairing extends from the frame into a space below the belt, wherein the fairing extends along at least a portion of the length traversed by the belt, wherein an entirety of the fairing is spaced apart from the belt and does not support the belt directly or indirectly; and
   a hood cover disposed above the belt, wherein the fairing and the hood cover are arranged or coupled to one another such that crosswind is deflected either above the hood cover or below the fairing.

7. The trough conveyor of claim 6 wherein the fairing is planar and generally horizontal, with generally horizontal being within ±5 degrees of a rotational axis of a center roll.

8. The trough conveyor of claim 7 wherein the fairing comprises a lateral wall that is distinct from a generally horizontal portion of the fairing and that is secured to the frame.

9. The trough conveyor of claim 6 wherein the fairing is secured directly to the hood cover at the frame in a way that prevents crosswind from entering a stilling space between the belt and the hood cover.

10. The trough conveyor of claim 6 wherein an edge of the fairing nearest the belt is disposed beneath an underside of the belt.

11. The trough conveyor of claim 6 wherein the fairing includes an adjustable hinge that is configured to adjust an angle of the fairing relative to the frame.

12. The trough conveyor of claim 6 wherein the fairing comprises a cutout extending in the longitudinal direction, wherein the wing roll extends at least partially through the cutout of the fairing.

13. The trough conveyor of claim 6 wherein the hood cover and the fairing meet at a point that is equal to or lower than the second end of the angled segment of the belt.

14. The trough conveyor of claim 6 wherein a portion of the fairing that is closest to the ground is closer to the ground than a horizontal portion of the belt.

15. The trough conveyor of claim 6 wherein an entirety of a generally horizontal portion of the fairing is lower than the second end of the angled segment of the belt.

16. A trough conveyor comprising:
    a belt for transporting material in a longitudinal direction, the belt including an angled segment having a first end that is lower than a second end;
    a wing roll that supports the angled segment of the belt;
    a frame that supports the wing roll;
    a hood cover disposed above the belt; and
    a baffle that extends in the longitudinal direction and is configured to prevent crosswind from reaching a stilling space between the belt and the hood cover, the baffle comprising a first wall and a second wall, wherein the first and second walls form a "V" shape or a "U" shape disposed about the angled segment of the belt, wherein the first wall of the baffle is between 0 and 6 inches from an upper surface of the angled segment of the belt as measured between closest points of the first wall and the upper surface of the belt.

17. The trough conveyor of claim 16 wherein the angled segment is a first angled segment and the baffle is a first baffle, the trough conveyor comprising:
    a second angled segment disposed opposite the first angled segment, the second angled segment having a first end that is lower than a second end; and
    a second baffle comprising a first wall and a second wall, wherein the first and second walls of the second baffle form a "V" shape or a "U" shape disposed about the second angled segment of the belt,
    wherein the stilling space is formed between the hood cover, the belt, the first baffle, and the second baffle at a longitudinal location along a length of the trough conveyor between a loading station and a discharge station,
    wherein the first and second walls of each baffle form a labyrinth that wind must traverse before reaching the stilling space.

18. The trough conveyor of claim 16 wherein the second wall of the baffle includes a cutout in the longitudinal direction for receiving the wing roll.

19. The trough conveyor of claim 16 wherein the first wall is closer to the upper surface than the second wall to the lower surface.

20. The trough conveyor of claim 16 wherein the second wall of the baffle is between 0 and 6 inches from a lower surface of the angled segment of the belt as measured between closest points of the second wall and the lower surface.

* * * * *